United States Patent
Zilliacus et al.

(10) Patent No.: US 7,697,894 B2
(45) Date of Patent: Apr. 13, 2010

(54) METHOD AND SYSTEM FOR TACTILE CONFIRMATION OF SERVICE BOOKMARKS

(75) Inventors: Martin Zilliacus, Kauniainen (FI); Marco Sandrini, Helsinki (FI); Sakari Kotola, Kauniainen (FI); Jorma Vartia, Helsinki (FI); Petri Vesikivi, Espoo (FI)

(73) Assignee: Nokia Corporation, Espoo (FI)

( * ) Notice: Subject to any disclaimer, the term of this patent is extended or adjusted under 35 U.S.C. 154(b) by 1297 days.

(21) Appl. No.: 11/067,764

(22) Filed: Mar. 1, 2005

(65) Prior Publication Data

US 2006/0199533 A1 Sep. 7, 2006

(51) Int. Cl.
*H04B 7/00* (2006.01)
(52) U.S. Cl. ............... 455/41.2; 455/41.1; 455/411; 455/412.1; 340/854.6; 340/854.7; 340/854.8
(58) Field of Classification Search ......... 455/41.1, 455/41.2, 414, 425, 566, 411, 466, 412.1; 340/854.6, 854.7, 854.8, 10.1, 10.3
See application file for complete search history.

(56) References Cited

U.S. PATENT DOCUMENTS

| | | | |
|---|---|---|---|
| 5,521,251 A | 5/1996 | Satoh et al. | |
| 5,819,039 A | 10/1998 | Morgaine | |
| 6,112,103 A | 8/2000 | Puthuff | |
| 6,219,696 B1 | 4/2001 | Wynblatt et al. | |
| 6,532,368 B1 | 3/2003 | Hild et al. | |
| 6,591,266 B1 | 7/2003 | Li et al. | |
| 6,601,093 B1 | 7/2003 | Peters | |
| 6,631,269 B1 | 10/2003 | Cave | |
| 6,633,757 B1 | 10/2003 | Hermann et al. | |
| 6,657,713 B2 | 12/2003 | Hansen | |
| 6,757,715 B1 | 6/2004 | Philyaw | |
| 6,765,474 B2 | 7/2004 | Eaton et al. | |
| 6,909,721 B2 | 6/2005 | Ekberg et al. | |
| 6,981,210 B2 | 12/2005 | Peters et al. | |
| 7,028,032 B1 | 4/2006 | Diedrich et al. | |
| 7,158,176 B2 | 1/2007 | Tokkonen et al. | |

(Continued)

FOREIGN PATENT DOCUMENTS

EP 1246487 A2 2/2002

(Continued)

OTHER PUBLICATIONS

"Assigned Numbers", article [online], Bluetooth SIG, Inc., 1999-2001 [2 pages retrieved on Sep. 3, 2003]. Retrieved from the Internet: <http://www.bluetoothsig.org/assigned-numbers/>.

(Continued)

*Primary Examiner*—Tuan A Pham
(74) *Attorney, Agent, or Firm*—Ditthavong Mori & Steiner, P.C.

(57) ABSTRACT

A wireless communication method and device for managing information available via a wireless connection. Service information may be transmitted to a wireless communication device (WCD) via a short-range wireless network. Authentication information is scanned from an object containing machine-readable data via a different short-range communication medium. The authentication information is used to determine whether the downloaded service information should be permanently stored and made available in the user interface of the WCD.

33 Claims, 9 Drawing Sheets

U.S. PATENT DOCUMENTS

| | | | |
|---|---|---|---|
| 2002/0012329 A1 | 1/2002 | Atkinson et al. | |
| 2002/0039367 A1 | 4/2002 | Seppala et al. | |
| 2002/0044549 A1 | 4/2002 | Johansson et al. | |
| 2002/0073204 A1 | 6/2002 | Dutta et al. | |
| 2002/0120750 A1 | 8/2002 | Nidd | |
| 2002/0123360 A1 | 9/2002 | Vikman et al. | |
| 2002/0124046 A1 | 9/2002 | Fischer et al. | |
| 2002/0129170 A1 | 9/2002 | Moore et al. | |
| 2002/0152299 A1 | 10/2002 | Traversat et al. | |
| 2002/0160758 A1 | 10/2002 | Pradhan et al. | |
| 2002/0160793 A1 | 10/2002 | Pradhan et al. | |
| 2002/0178215 A1 | 11/2002 | Lacksono et al. | |
| 2002/0188657 A1 | 12/2002 | Traversat et al. | |
| 2003/0013483 A1 | 1/2003 | Ausems et al. | |
| 2003/0037033 A1 | 2/2003 | Nyman et al. | |
| 2003/0041141 A1 | 2/2003 | Abdelaziz et al. | |
| 2003/0054806 A1 | 3/2003 | Ho et al. | |
| 2003/0061364 A1 | 3/2003 | Banerjee et al. | |
| 2003/0069016 A1 | 4/2003 | Bahl et al. | |
| 2003/0078062 A1 | 4/2003 | Burr | |
| 2003/0110218 A1 | 6/2003 | Stanley | |
| 2003/0114101 A1* | 6/2003 | Paz ........................... | 454/224 |
| 2003/0115415 A1 | 6/2003 | Want et al. | |
| 2003/0131059 A1 | 7/2003 | Brown et al. | |
| 2003/0207683 A1 | 11/2003 | Lempio et al. | |
| 2003/0208522 A1 | 11/2003 | McDonnell et al. | |
| 2003/0228842 A1 | 12/2003 | Heinonen et al. | |
| 2004/0002385 A1 | 1/2004 | Nguyen | |
| 2004/0009750 A1 | 1/2004 | Beros et al. | |
| 2004/0015403 A1 | 1/2004 | Moskowitz et al. | |
| 2004/0030743 A1 | 2/2004 | Hugly et al. | |
| 2004/0043770 A1 | 3/2004 | Amit et al. | |
| 2004/0063498 A1 | 4/2004 | Oakes et al. | |
| 2004/0063980 A1 | 4/2004 | Raths et al. | |
| 2004/0064568 A1 | 4/2004 | Arora et al. | |
| 2004/0075675 A1 | 4/2004 | Raivisto et al. | |
| 2004/0087274 A1 | 5/2004 | Ekberg et al. | |
| 2004/0114557 A1 | 6/2004 | Bryan et al. | |
| 2004/0171378 A1 | 9/2004 | Rautila | |
| 2004/0224706 A1 | 11/2004 | Lorello et al. | |
| 2004/0225712 A1 | 11/2004 | Tajima et al. | |
| 2004/0248514 A1* | 12/2004 | Idani et al. ................. | 455/41.2 |
| 2005/0058108 A1 | 3/2005 | Ekberg et al. | |
| 2005/0058109 A1 | 3/2005 | Ekberg | |
| 2005/0059379 A1 | 3/2005 | Sovio et al. | |
| 2005/0088980 A1 | 4/2005 | Olkkonen et al. | |
| 2005/0114756 A1 | 5/2005 | Lehikoinen et al. | |
| 2005/0185660 A1 | 8/2005 | Ekberg et al. | |
| 2005/0197062 A1* | 9/2005 | Sprogis ..................... | 455/41.2 |
| 2005/0208892 A1 | 9/2005 | Kotola | |
| 2005/0239494 A1 | 10/2005 | Klassen et al. | |
| 2006/0058011 A1 | 3/2006 | Vanska et al. | |
| 2006/0258338 A1 | 11/2006 | Markki et al. | |
| 2006/0268896 A1 | 11/2006 | Kotola et al. | |
| 2007/0202859 A1* | 8/2007 | Ward ....................... | 455/414.1 |

FOREIGN PATENT DOCUMENTS

| | | |
|---|---|---|
| EP | 1 253 540 A2 | 10/2002 |
| EP | 123540 A2 | 10/2002 |
| EP | 1246487 A3 | 10/2002 |
| EP | 1392023 A2 | 2/2004 |
| EP | 1392023 A3 | 2/2004 |
| GB | 2410153 A | 7/2005 |
| JP | 2003/016347 A1 | 1/2003 |
| WO | WO 99/41876 | 8/1999 |
| WO | WO 00/72506 A1 | 11/2000 |
| WO | WO 01/45319 A1 | 6/2001 |
| WO | WO 01/95592 | 12/2001 |
| WO | WO 02/071285 | 9/2002 |
| WO | WO 03/034664 A1 | 4/2003 |
| WO | WO 2004/038541 A2 | 5/2004 |
| WO | WO 2005/038696 | 4/2005 |
| WO | WO 2006/092688 A2 | 9/2006 |

OTHER PUBLICATIONS

"Assigned Numbers—Bluetooth Baseboard", article [online], Bluetooth SIG., Inc. 1999-2001 [7 pages retrieved on Sep. 3, 2003]. Retrieved from the Internet <http://www.bluetoothsig.org/assigned-numbers/baseband.htm>.

"Assigned Numbers—Link Manager Protocol (LMP)", article [online], Bluetooth SIG, Inc. 1999-2001 [1 page retrieved on Sep. 3, 2003]. Retrieved from the Internet <http://www.bluetoothsig.org/assigned-numbers/lmp.htm>.

"Assigned Numbers—Logical Link Control and Adaptation Protocol (L2CAP)", article [online], Bluetooth SIG., Inc. 1999-2001 [2 pages retrieved on Sep. 3, 2003]. Retrieved from the Internet <http://www.bluetoothsig.org/assigned-numbers/l2cap.htm>.

"Assigned Numbers—Service Discovery Protocol (SDP)", article [online], Bluetooth SIG., Inc. 1999-2001 [11 pages retrieved on Sep. 3, 2003]. Retrieved from the Internet <http://www.bluetoothsig.org/assigned-numbers/sdp.htm>.

"Assigned Numbers—Service Discovery Protocol (SDP)", article [online], Bluetooth SIG., Inc. 1999-2001 [5 pages retrieved on Sep. 3, 2003]. Retrieved from the Internet <http://www.bluetoothsig.org/assigned-numbers/host.htm>.

"Assigned Numbers—Company Identifiers", article [online], Bluetooth SIG., Inc. 1999-2001 [3 pages retrieved on Sep. 3, 2003]. Retrieved from the Internet <http://www.bluetoothsig.org/assigned-numbers/company.htm>.

"Assigned Numbers—References", article [online], Bluetooth SIG., Inc. 1999-2001 [6 pages retrieved on Sep. 3, 2003]. Retrieved from the Internet <http://www.bluetoothsig.org/assigned-numbers/tail.htm>.

"All About ISOC", web page [online], Internet Society, 2002 [2 pages retrieved on Oct. 23, 2003]. Retrieved from the Internet: <http://www.isoc.org/isoc/>.

"All About ISOC: Conferences—NDSS", web page [online], Internet Society, 2002 [1 page retrieved on Oct. 23, 2003]. Retrieved from the Internet: <http://www.isoc.org/isoc/conferences/ndss/>.

"Internet Society (ISOC): All About The Internet", web page [online], Internet Society, 2002 [1 page retrieved on Oct. 23, 2003]. Retrieved from the Internet: <http://www.isoc.org/isoc/conferences/ndss/02/>.

"NDSS Conference Proceedings: 2002", web page [online], Internet Society [2 pages retrieved on Oct. 23, 2003]. Retrieved from the Internet: <http://www.isoc.org/isoc/conferences/ndss/02/proceedings/>.

Balfanz et al. "Talking to Strangers: Authentication in Ad-Hoc Wireless Networks", Xerox Palo Alto Research Center, (Date Unknown), 13 pages.

Kammer et al., "Bluetooth Application Developer's Guide: The Short Range Interconnect Solution", Syngress Publishing, Inc., 2002, pp. 1-68.

Bobba et al., Bootstrapping Security Associations for Routing in Mobile Ad-Hoc Workstations, IEEE Global Telecommunications Conference Proceedings; San Francisco, CA Dec. 1-5, 2003, IEEE Global Telecommunications Conference Proceedings, NY, NY: IEEE US, vol. 7 of 7; Dec. 1, 2003; pp. 1511-1513; GLOBCOM 2003; ISBN: 0-7803-7974-8.

"Windows NT Workstation"; Nov 2, 2003; pp. 1-14; XP002323988; Retrieved from Internet: www.meetsoon.com/sid3.html; Apr. 11, 2005.

Kolsi et al.; "MIDP 2.0 Security Enhancements" System Sciences, 2004; Proceedings of the 37 Annual Hawaii International Conference on Jan. 5-8, 2004, Piscataway, NJ; IEEE, Jan. 5, 2004, pp. 287-294, XP010682881; ISBN: 0-7695-2056-1.

PCT International Search Report for PCT/Ib2006/001347, Oct. 24, 2006, 4 pages.

* cited by examiner

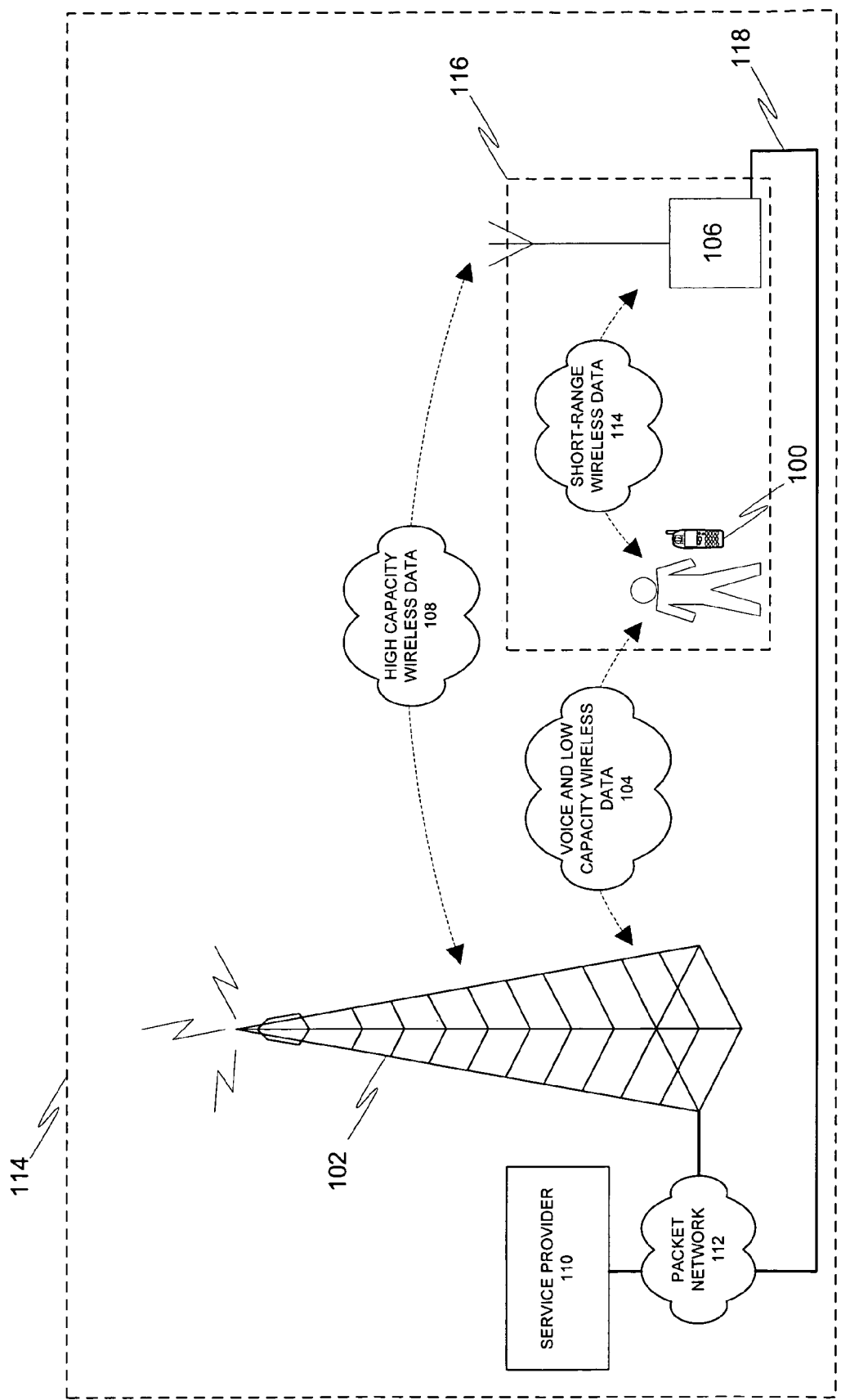

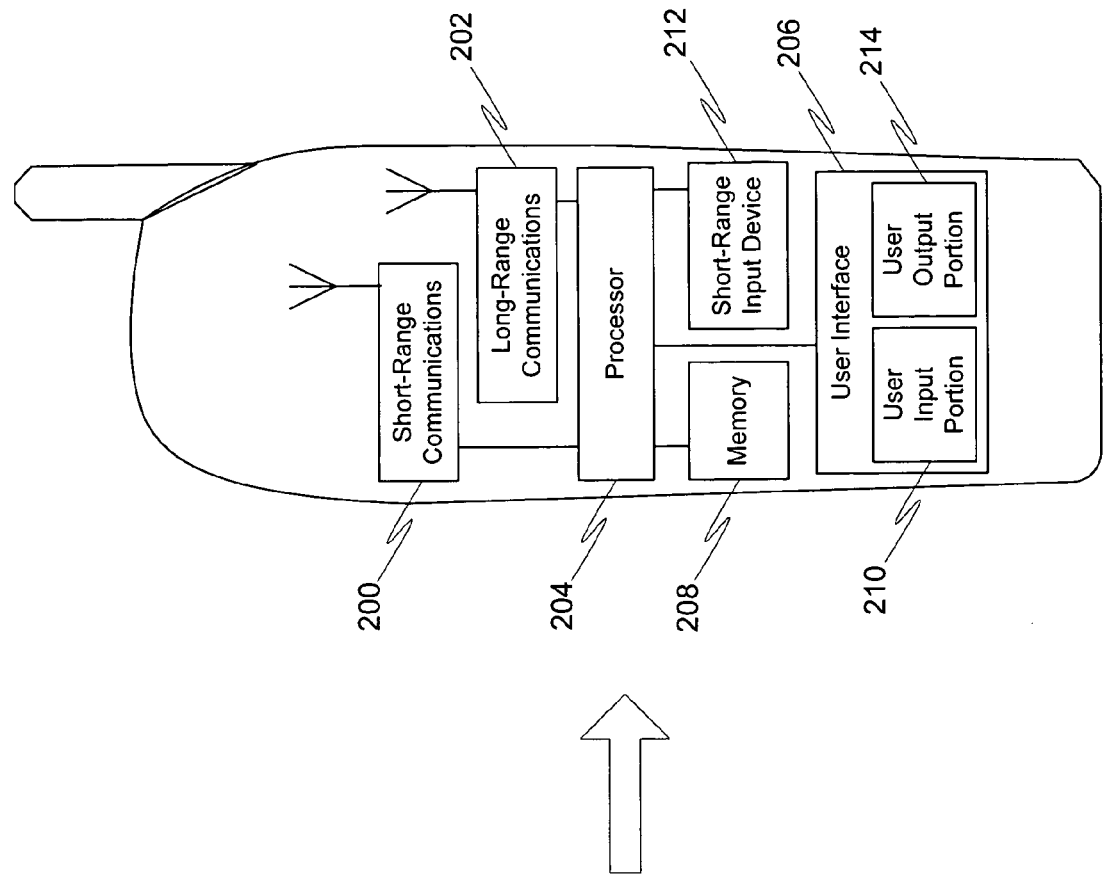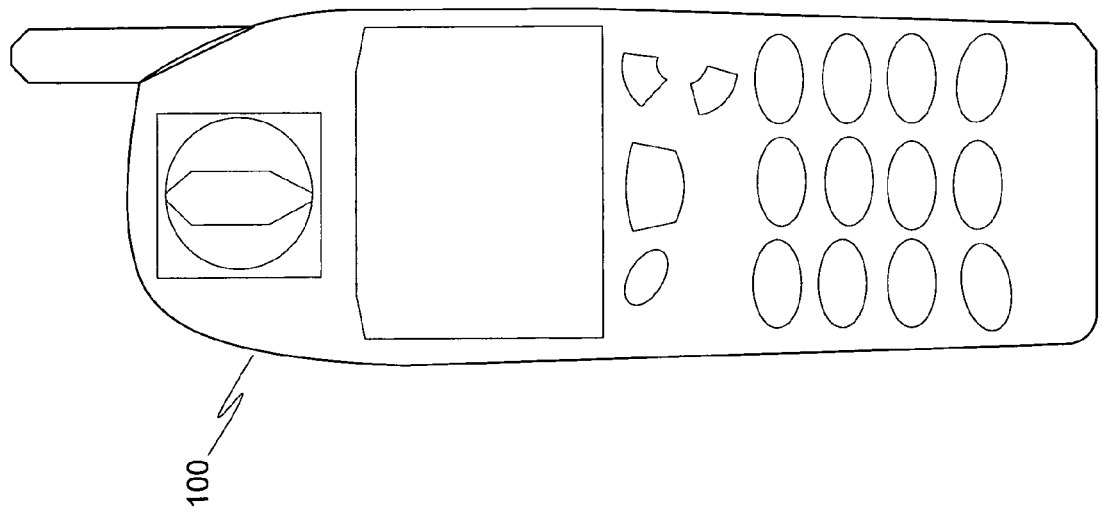
FIG. 2A

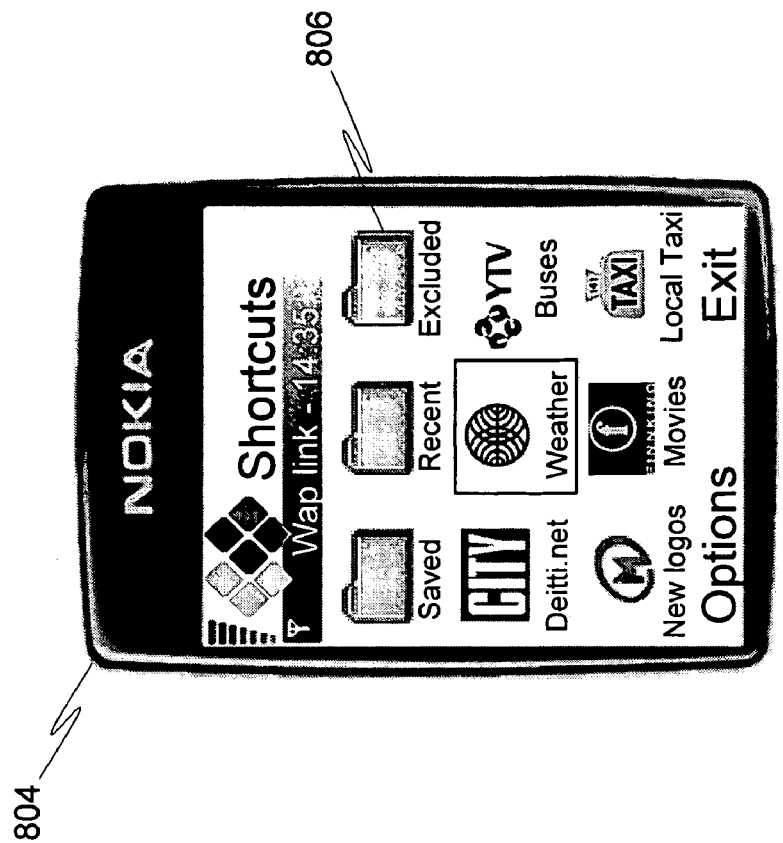
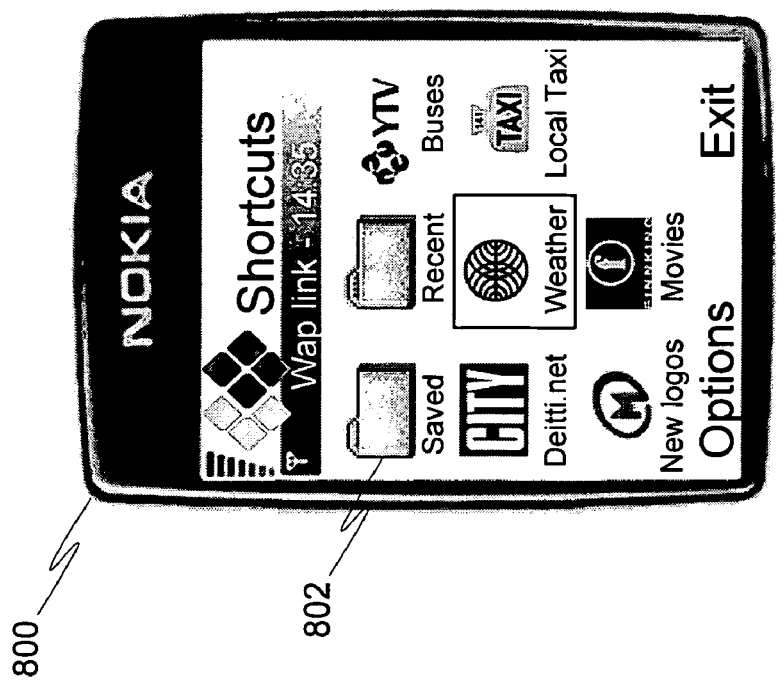
FIG. 8

METHOD AND SYSTEM FOR TACTILE CONFIRMATION OF SERVICE BOOKMARKS

RELATED CASE

This application is related to application Ser. No. 10/801,598, filed Mar. 17, 2004, entitled, SYSTEM AND METHOD FOR REMOTE SERVICE INFORMATION, assigned to Nokia Corporation.

BACKGROUND OF INVENTION

1. Field of Invention

The present invention relates to wireless communications. More particularly, the present invention relates to the management of automatically downloaded information received on a wireless communication device via short-range communications.

2. Description of Prior Art

Wireless communication devices (WCD) continue to proliferate in the marketplace due to technological improvements in both the quality of the communications and the functionality of the devices. Devices such as cellular telephones have become commonplace for both personal and business use, allowing users to transmit and receive voice, text and graphical data from a multitude of geographical locations. The communication networks utilized by WCDs span different frequencies and cover different broadcast distances, each having strengths applicable to different communication applications.

Cellular networks facilitate WCD communications over large geographic areas. GSM, a widely employed cellular network which communicates in the 900 MHZ-1.8 GHZ band in Europe and at 1.9 GHZ in the United States, provides voice communication and supports the transmission of textual data via the Short Messaging Service (SMS). SMS allows a WCD to transmit and receive text messages of up to 160 characters. It also provides data transfer to packet networks, ISDN and POTS users at 9.6 Kbps. While cellular networks like GSM are a well-accepted means for transmitting and receiving data, due to cost, traffic and legislative concerns, a cellular network may not be appropriate for all data applications.

Short-range wireless networks provide communication solutions that avoid the problems seen in cellular networks. Bluetooth™ is an example of a short-range wireless technology quickly gaining acceptance in the marketplace. A Bluetooth™ enabled WCD transmits and receives data at a rate of 720 Kbps within a range of 10 meters, and may transmit up to 100 meters with additional power boosting. A user does not actively instigate a Bluetooth™ network. Instead, a plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other piconet members.

The multitude of communication networks utilized by WCDs have created new opportunities for businesses to contact potential customers. Advertisers desire to use audio, text and graphical messages to promote goods and services directly to a consumer through a WCD. In order to control the rampant proliferation of advertising, often called "spamming" when referring to unsolicited email messages, many governments have implemented strict controls over how advertisers and information providers may use global cellular networks like GSM. For example, strict new laws are being passed in Korea where 5% of the 220 million cellular text messages sent daily are unsolicited advertisements. Many laws require opt-in for mobile marketing to prevent spam from getting to the consumer. For marketers, getting opt-in acceptance is a real problem. However, these regulatory problems currently do not exist for short-range networks.

Some services currently exist for marketers who desire to communicate information over short-range networks. The Nokia Local Marketing Solution is an information providing architecture for distributing data via short-range networks. A user who walks within transmission range of an access point using short-range communications (e.g., Bluetooth™) has information automatically downloaded to a memory buffer in the WCD. The user must then open a "shortcut" browser to select from various temporarily stored "bookmarks". The selected bookmark is then permanently saved in the WCD, and in some cases, additional data relevant to the saved bookmark may then be retrieved via a cellular network. Unselected bookmarks are automatically deleted from the memory buffer when space is required to download new content.

iJack™ is a similar service provided by TeliaSonera Finland Oyj that provides graphical information to a user in effective range of a service point. The service point includes a Bluetooth™ broadcast device which may be totally wireless in that the service point may also be programmed wirelessly using a GPRS cellular link to a business. The service point can then simultaneously broadcast information over a piconet containing up to seven Bluetooth™ enabled WCDs. The user requires an iJack™ browser to view the information. After the browser is loaded, information is automatically downloaded to a WCD whenever the user comes into range of a service point. To save the data, the user must open the browser, find the information and manually trigger a download to the WCD.

While advertising over a short-range network may provide an innovative way for a business to reach a target consumer, communicating via this medium is not without its limitations. In both of the aforementioned existing services, a user may be forced to specify a category of information to receive (e.g., "coupons") that does not adequately limit incoming messages. As a result, the WCD will continue to receive an overabundance of bookmarks. The user must repeatedly perform a manual sort through the downloaded information to indicate bookmarks desired to be saved. Otherwise, these desired bookmarks may inadvertently be discarded as older information is purged to make room in the memory buffer. The labor required for the user to manually maintain downloaded content is multiplied by the number of categories allowed to be downloaded to the WCD, turning an otherwise beneficial function into an unpleasant and tedious chore.

Further, a proliferation of wireless direct-to-consumer advertising may result in a backlash against these companies. Users who find their WCD filled with a plethora of undesired information, including spam, viruses and other unwelcome information, may take steps to prevent these messages from being downloaded. A disgruntled user could turn off the Bluetooth™ reception features of their WCD, which may result in all short-range communications being disabled in the device. This negatively impacts the consumer as well as the advertisers because the user will not be able to receive any advertisements, offers or information from which they might benefit.

As demonstrated above, software-based category filters are not dynamic nor precise enough to substantially improve the situation. Many category classifications include too much breadth to allow a user to define a specific subject matter out of the general field of messages. In addition, some information providers could take liberties with the classification of their messages so that they might bypass a filtering category. Finally, a user may want to receive information relevant to a certain geographic location, or only during a specific time period. For example, a user visiting a shopping mall may want to receive offers or coupons for sales only during the time they spend at that particular shopping mall. A category classification filter would require significant user configuration in order to provide a specific short-term permission in this manner.

Therefore, what is needed is a short-range wireless communication architecture that allows a WCD to receive only messages pertaining to desired offers or topics that may be conditionally implemented in a simple manner.

SUMMARY OF INVENTION

The instant invention solves the problems present in existing systems by providing a simplified communication solution wherein a user indicates desired subject matter to be downloaded by manually scanning authorization information into a WCD, the authorization information being used to decide which automatically downloaded bookmarks should be permanently retained, without requiring further intervention by the user.

The invention includes, but is not limited to, a method, a computer program product comprising a computer readable storage medium having computer readable program code embodied in the medium, and apparatus for managing information available via wireless connections wherein a user receives service and authentication information via wireless communication to a WCD. The service information, or bookmark, may include audio, text or graphical data. A bookmark is stored temporarily until corresponding service authentication information is also contained within the WCD, or upon the manual selection by a user.

The WCD receives at least part of the service information via short-range wireless communications. For example, the information may be automatically transferred when the WCD comes within range of a Bluetooth™ service point.

The corresponding service authentication is derived from machine-readable data scanned via short-range communication. A user positions a WCD near a displayed target object containing machine-readable data, allowing the WCD to read and retain service authentication information. In at least one embodiment, the scanning function of the WCD provides energy and a clock signal to a passive Radio Frequency Identification (RFID) transponder, which triggers the device to send a data response containing the service authentication information.

The temporarily stored service information is continually compared to the saved service authentication information. If the service information corresponds to the authentication information, the service information is permanently saved. The service information is then made available on the WCD via a user interface. In some instances, the user may then select the bookmark resulting in additional content being downloaded from a cellular network like GSM.

DESCRIPTION OF DRAWINGS

The invention will be further understood from the following detailed description of a preferred embodiment, taken in conjunction with appended drawings, in which:

FIG. 1 is a representation of typical wireless communication networks and how these networks interact with a user having a wireless communication device.

FIG. 2A is a representation of a wireless communication device and the functional components included within a wireless communication device used in an embodiment of the present invention.

FIG. 8 is a representation of various user interfaces on a wireless communication device in accordance with an embodiment of the present invention.

DESCRIPTION OF PREFERRED EMBODIMENT

Figure 2B:
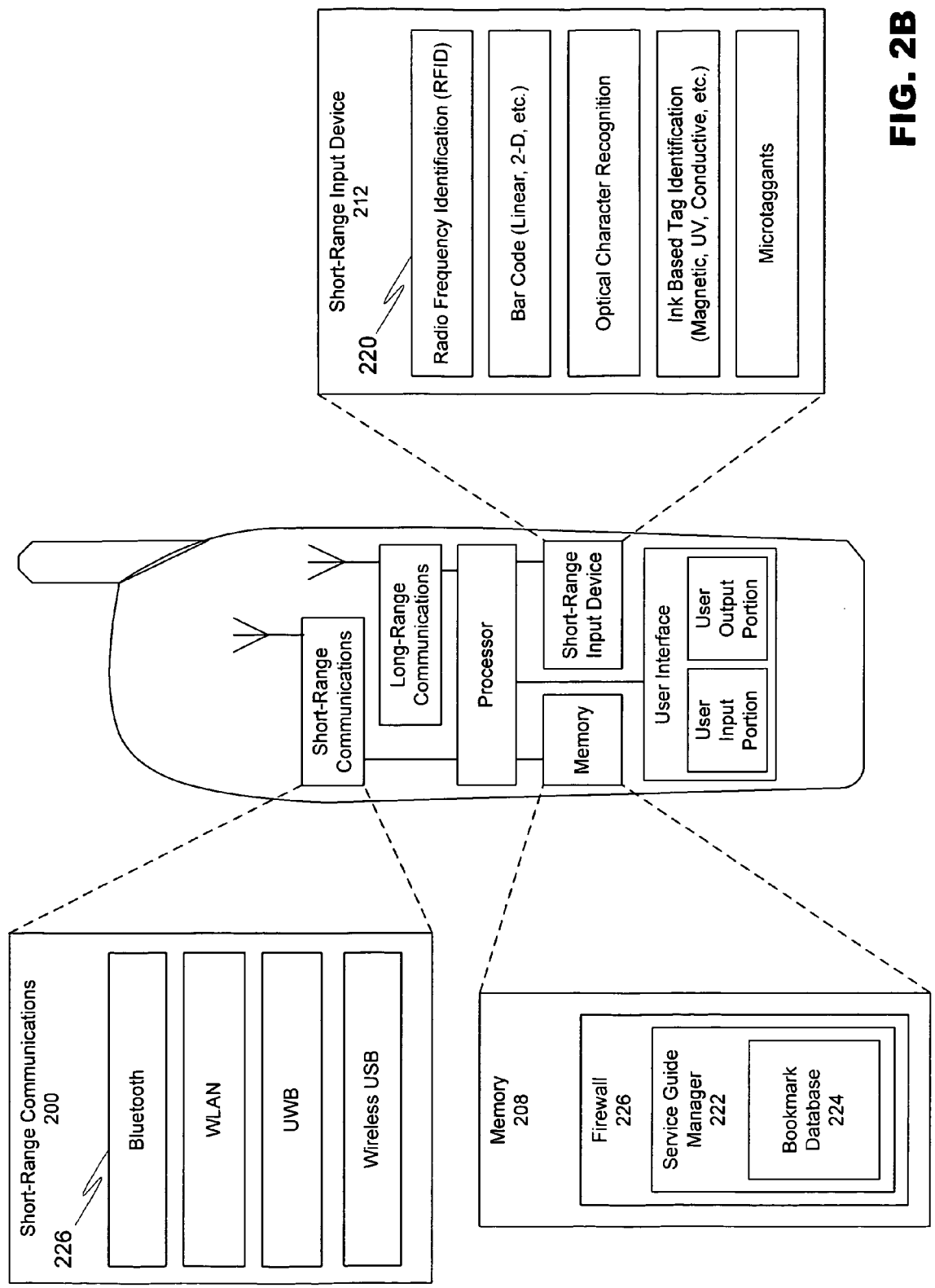
FIG. 2b is a representation of a wireless communication device further defining specific functionality encompassed within a wireless communication device used in an embodiment of the present invention.

While the invention has been described in preferred embodiments, various changes can be made therein without departing from the spirit and scope of the invention, as described in the appended claims, in which:

I. Operational Environment

Before describing the invention in detail, it is helpful to describe an environment in which the invention may be used. Accordingly, FIG. 1 is a diagram of an exemplary operational environment in which a WCD 100 may collect and consume services according to techniques of the present invention.

WCD 100 is capable of engaging in various types of wireless communications. For instance, WCD 100 may engage in short-range communications 114, as well as long range cellular communications 104 (e.g., GSM). Examples of short-range communications are not limited to Bluetooth™, WLAN (i.e., IEEE 802.11), ultra wideband (UWB) and/or wireless USB transmission. As shown in FIG. 1, WCD 100 may enter within communications range of an access point 106. This communications range is defined by a coverage area 116, which determines the locations at which these devices may communicate.

When WCD 100 is within coverage area 116 of access point 106, it may enter into a short-range communications connection with access point 106. Once this connection is established, access point 106 may provide information to WCD 100 regarding various available services. This information may include one or more links or shortcuts to such services. These links may be transmitted to WCD 100 in an arrangement or data structure that is referred to herein as a service bookmark 508. Details regarding bookmark 508 are described below with reference to FIG. 5.

WCD 100 is also capable of communicating by employing short-range scanning of a target object containing machine-readable data. For instance, RFID communications can be used to scan a target object located within, or in proximity to, an access point 106. For such communications, the target object may include a transponder, which provides data (e.g., tag 500, described below with reference to FIG. 5) to WCD 100 in response to a scan performed by WCD 100. Such communications may occur at a very close proximity to the target object (e.g., almost touching). Accordingly, for RFID communications, coverage area 116 may span a few feet.

Various service providers 110 provide these services. In the environment of FIG. 1, WCD 100 communicates with service providers 110 across a backbone network 114. FIG. 1 shows that backbone network 114 includes a packet-based network 112 (e.g., the Internet) and a cellular network 102. Cellular network 102 may include base stations and a mobile switching center. However, these implementations are provided for purposes of illustration, In fact, other network types and arrangements are within the scope of the present invention.

Backbone network 114 is also used for the accumulation of links by access points 106. For instance, each service provider 110 may transmit information regarding its services to access point 106 via a high capacity wireless data network 108. Non-limiting examples of high capacity wireless data networks include unidirectional broadcast networks such as DVB used alone, or in combination with, a cellular network employing for example GPRS. Alternatively, an access point 106 may be connected to the packet network 112 via hardwire network connection 118. The information transmitted from the service provider may include data (e.g., bookmarks) to be collected by WCD 100. In addition, backbone network 114 may be used by WCD 100 to obtain further data from service providers 110 related to bookmark information received from access point 106.

II. Wireless Communication Device

FIG. 2A discloses an exemplary functional layout of WCD 100. Processor 204 controls overall device operation. As shown in FIG. 2A, processor 204 is coupled to communications sections 200, 202 and 212. Processor 204 may be implemented with one or more microprocessors that are each capable of executing software instructions stored in memory 208.

Memory 208 may include random access memory (RAM), read only memory (ROM), and/or flash memory, and stores information in the form of data and software components (also referred to herein as modules). The data stored by memory 208 may be associated with particular software components. In addition, this data may be associated with databases, such as bookmark database 224 seen in FIG. 2B.

The software components stored by memory 208 include instructions that can be executed by processor 204. Various types of software components may be stored in memory 208. For instance, memory 208 may store software components that control the operation of communication sections 200, 202 and 212. Also, memory 208 may store software components including a firewall 226, the service guide manager 222, bookmark database 224, user interface manager 206, and any required communications utilities modules.

Short-range communications 200 is responsible for functions involving the exchange of information across short-range wireless networks. As described above, examples of such short-range communications 226 are not limited to Bluetooth™, WLAN, UWB and Wireless USB connections. Accordingly, short-range communications 200 performs functions related to the establishment of short-range connections, as well as processing related to the transmission and reception of information via such connections.

Short-range input device 212, as depicted in FIGS. 2A and 2B, may provide functionality related to the short-range scanning of machine-readable data. For example, processor 204 may control short-range input device 212 to generate RF signals for activating RFID transponders, and may in turn control the reception of signals from RFID transponders. Other short-range scanning methods 220 for reading machine-readable data that may be supported by the short-range input device 212 are not limited to linear and 2-D bar code readers (including processes related to interpreting UPC labels), and optical character recognition devices for reading magnetic, UV, conductive or other type of coded data that may be provided to the tag using suitable ink. In order for the short-range input device to scan the aforementioned types of machine-readable data, the input device may include optical detectors, magnetic detectors, CCDs or other sensors known in the art for interpreting machine-readable information.

Long-range communications 202 performs functions related to the exchange of information across large coverage area networks (such as cellular networks) via an antenna. Therefore, long-range communications 202 may operate to establish data communications sessions, such as General Packet Radio Service (GPRS) sessions and/or Universal Mobile Telecommunications System (UMTS) sessions. Also, long-range communications 202 may operate to transmit and receive messages, such as short messaging service (SMS) messages and/or multimedia messaging service (MMS) messages.

As shown in FIG. 2A, user interface 206 is also coupled to processor 204. User interface 206 facilitates the exchange of information with a user. FIG. 2A shows that user interface 206 includes a user input portion 210 and a user output portion 214. User input portion 210 may include one or more components that allow a user to input information. Examples of such components are not limited to keypads, touch screens, and microphones. User output portion 214 allows a user to receive information from the device. Thus, user output portion 214 may include various components, such as a display, and one or more audio speakers. Exemplary displays include liquid crystal displays (LCDs), and video displays.

Hardware corresponding to communications sections 200, 202 and 212 provide for the transmission and reception of signals. Accordingly, these portions may include components (e.g., electronics) that perform functions, such as modulation, demodulation, amplification, and filtering. These portions may be controlled by communications modules stored in memory 208.

The elements shown in FIG. 2A may be coupled according to various techniques. One such technique involves coupling hardware corresponding to communications sections 200, 202 and 212, processor 204, memory 208, and user interface 206 through one or more bus interfaces. In addition, each of these components is coupled to a power source, such as a removable and/or rechargeable battery (not shown).

FIG. 2B discloses that firewall 226, service guide manager 222 and bookmark database 224 are contained in memory 208. For example, firewall 226 may be a Bluetooth™ firewall which allows or prevents certain bookmarks from being downloaded based on certificate information which ensures that the alleged service provider distributing the bookmark is in actuality the true service provider, and that the service provider is a trusted source. Bookmarks can also be signed with a certain service certificate so that the WCD can compare/encrypt the received bookmarks. The service certificate may be received in the WCD by scanning machine-readable data. When the WCD scans this data, the user may also be presented with a license agreement requiring the user to agree to the terms of the license, for example by way of a downloadable Java midlet that provides the necessary user interface and connectivity to the service provider. Once the user approves the license, a confirmation message may be sent to the service provider (e.g., via an SMS message) by the midlet, and the certificate is provided back to the user in a response message. Control at this low level prevents malicious programs or Spam from being downloaded by the service manager 222. Firewall 226 may operate on the principle that only certain bookmarks related to a service provider are accepted, or alternatively so that only certain bookmarks are excluded. For example, in the instant invention an RFID tag may indicate a Bluetooth™ identification number that adds bookmarks with the same identification number to an "allowed" list to permit downloading. Service guide manager 222 provides for the management and storage of data received from remote devices, such as service point 106. Such remote devices are referred to herein as service points. The received data may be in various forms. One such form is a bookmark. However, other forms are within the scope of the present invention.

Firewall 226 and service guide manager 222 may operate as background processes. This allows for the collection of data (e.g., bookmarks linked to services) without interrupting the user's operation of the device. Over time, the device collects new data. However, in order to handle the device's memory constraints, new service information cannot be collected indefinitely without deleting the older data.

The service guide manager 222 may process and permanently store bookmarks in bookmark database 224. Bookmark database 224 provides for the storage of data (such as service bookmarks). These bookmarks may be stored in various folders, where each folder corresponds to a particular menu. Examples of such folders 802 are shown in FIG. 8 and may include a dynamic folder, a recent folder, and a saved folder. The dynamic folder is for storing received service bookmarks. The recent folder is for storing service bookmarks that were recently activated. The saved folder is for storing service bookmarks selected for storage by a user (e.g., favorites). In embodiments of the present invention, each folder may have a specified maximum number of service bookmarks that may be stored. A non-limiting exemplary maximum number of service bookmarks is ten.

The bookmark database 224 may also store categorical information, such as keywords. The categorical information may be mapped to the stored bookmarks. This advantageously helps a user perform topical searches for particular bookmarks. Such categorical information may accompany data when it is received from a service point.

Service guide manager 222 is also coupled to a user interface manager stored in memory 208. The user interface manager provides functionality, such as a graphical user interface, for the presentation of links to users. In addition, this functionality provides for user selection and activation of links.

The service guide manager 222 may also interact with a communications utilities module, also contained in memory 208, which provides for the establishment of service sessions using long-range communications 202 and/or short-range communications 200. The communications utilities module may include various components that allow the reception of services from remote devices according to protocols, such as the Wireless Application Protocol (WAP).

When engaging in WAP communications with a remote server, the device functions as a WAP client. To provide this functionality, the module may include WAP client software having components, such as a Wireless Markup Language (WML) Browser, a WMLScript engine, a Push Subsystem, and a Wireless Protocol Stack.

Applications (not shown) may interact with the WAP client software to provide a variety of communications services. Examples of such communications services include the reception of Internet-based content, such as headline news, exchange rates, sports results, stock quotes, weather forecasts, multilingual phrase dictionaries, shopping and dining information, local transit (e.g., bus, train, and/or subway) schedules, personal online calendars, and online travel and banking services.

The WAP-enabled device may access small files called decks which each include smaller pages called cards. Cards are small enough to fit into a small display area that is referred to herein as a microbrowser. The small size of the microbrowser and the small file sizes are suitable for accommodating low memory devices and low-bandwidth communications constraints imposed by wireless links.

Cards are written in the Wireless Markup Language (WML), which is specifically devised for small screens and one-hand navigation without a keyboard. WML is scaleable so that it is compatible with a wide range of displays that covers two-line text displays, as well as large LCD screens found on devices, such as smart phones, PDAs, and personal communicators. WML cards may include programs written in WMLScript, which is similar to JavaScript. However, through the elimination of several unnecessary functions found in these other scripting languages, WMLScript reduces memory and processing demands.

III. Operation

Figure 3:
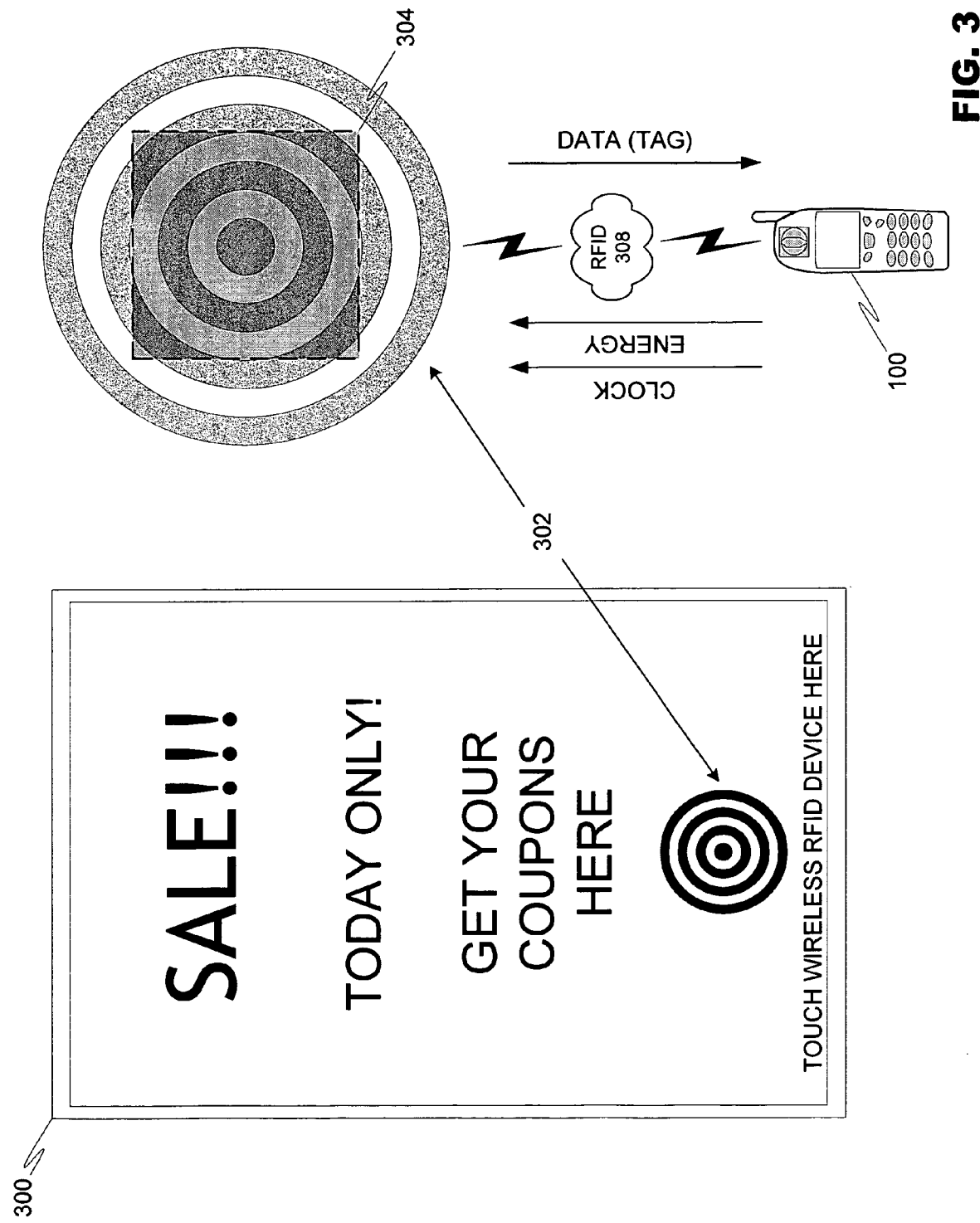
FIG. 3 is a representation of an RFID transponder and the interaction of a wireless communication device with the RFID transponder in accordance with an embodiment of the present invention.

The operation of an embodiment of the present invention will now be described. FIG. 3 describes an example interaction between a WCD and a target object containing machine-readable data. In this example the machine-readable data is RFID data. Display 300 is an information conveyance device not limited to a poster, sign, display, standee, etc. In the exemplary embodiment shown in FIG. 3, display 300 is an advertisement for a sale. The display contains visual indicia indicating information that may be of interest to a consumer, and also includes a target area 302. The visual indicia may indicate that a cellular phone or other WCD should be touched to or placed near the target area 302.

Figure 5:
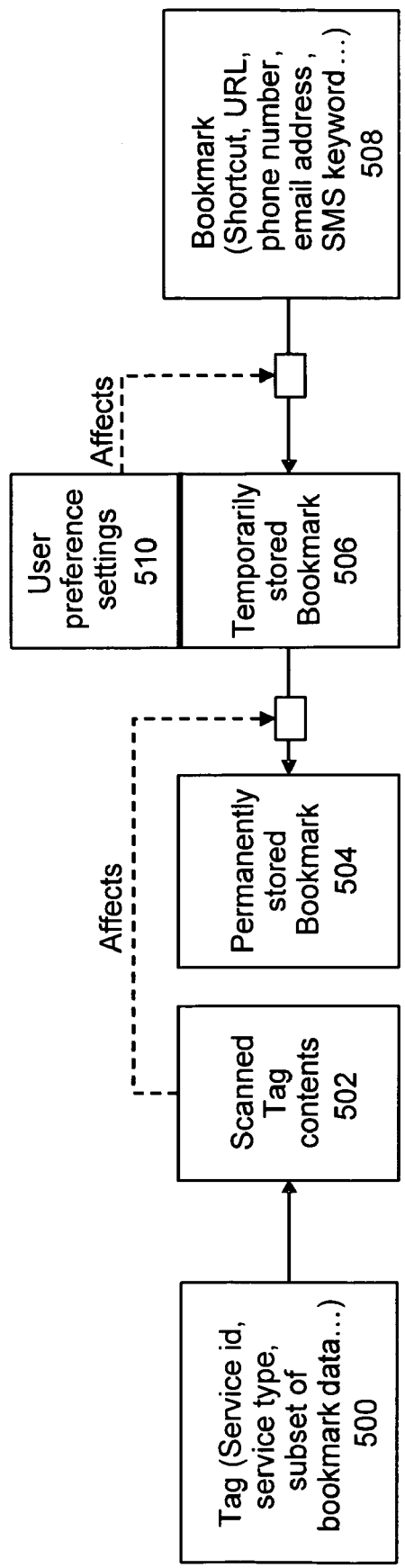
FIG. 5 is a representation of the data flow within a wireless communication device when an RFID tag and a Bluetooth™ bookmark are received in accordance with an embodiment of the present invention.

When a WCD 100 is placed near the target area an information exchange takes place. FIG. 3 further shows a transparent view of the target area 302 including a target object 304 imbedded within, placed near or behind the target area. In this case the target object 304 is an RFID transponder. When the WCD 100 is held near the target, the RFID scan signal 308 of the WCD 100 provides an RF energy field and clock signal to the target object 304. The transponder uses the energy and clock signal to issue a data signal that is received by the WCD 100. The data transferred from an RFID transponder may range anywhere from 1 bit to several KB, and may contain a service id, service type, a classification or subset of bookmark data, etc. The scanned data received, which will hereafter be referred to as tag data, is then stored within the WCD 100 in scanned tag contents 502 as depicted in FIG. 5.

Figure 4:
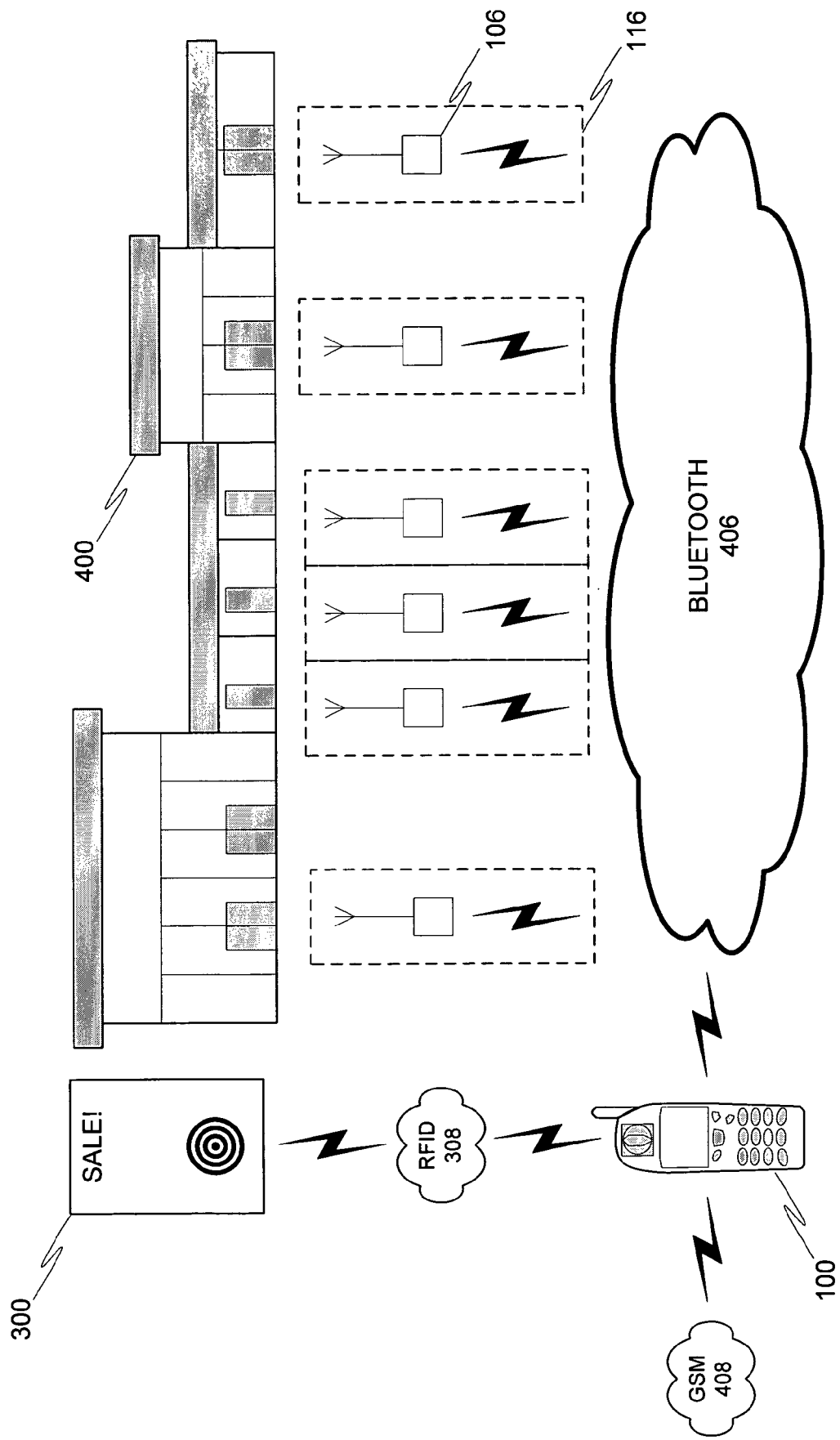
FIG. 4 is a representation of an interaction between a wireless communication device and various wireless networks in accordance with an embodiment of the present invention.

FIG. 4 expands on operation of this embodiment of the invention. The WCD 100 is enabled for cellular communications, (e.g., GSM 408), and for short-range communications (e.g., Bluetooth™ 406) and for scanning machine-readable data (e.g., RFID 308). Here, a shopping mall 400 contains a plurality of stores. Each store may have a service point 106 providing short range communication such as Bluetooth™ 406. Each service point has an effective transmission range 116. As a customer traverses through the mall, they will move from store to store. This brings a shopper's WCD 100 within an effective range 116 of each service point 106. A service point 106 using Bluetooth™ will attempt to set up a piconet including WCD 100, wherein the service point 106 will download bookmark information to the WCD 100. Bookmark information may include, but is not limited to, Shortcut information, phone numbers. Email addresses, SMS keywords, etc.

The user will only be able to automatically access bookmarks to which a corresponding tag has been downloaded. FIG. 5 depicts the interactions between tags and bookmarks. A tag is downloaded at 500 via the previously machine-readable data communication, and is stored in a tag contents 502. Through a separate transaction, Bookmark information 508 is stored in a temporary state 506 according to user settings 510. User settings 510 may affect bookmark downloading by, for example, enabling or disabling short-range communications for WCD 100. A tag in tag contents 502 corresponding to temporarily stored shortcut 506 will indicate that the shortcut is related to information the user desires to view, and therefore the shortcut is permanently stored in memory at 504 and made available to the user to view via a user interface 800 as depicted in FIG. 8.

Figure 6:
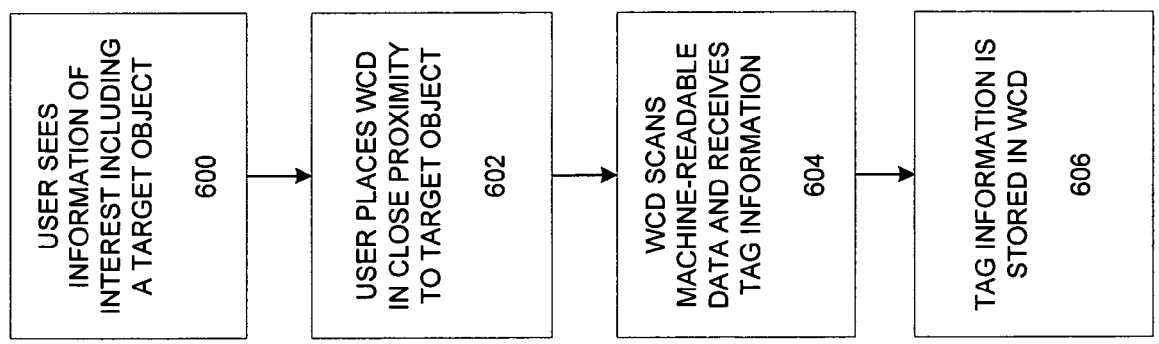
FIG. 6 is a representation of the process when an machine-readable data is received by a wireless communication device in accordance with an embodiment of the present invention.

A method for using the invention, according to at least one embodiment, will now be explained in view of FIG. 6. In step 600, A user bearing a WCD sees information of interest publicly displayed. The display, for instance, may advertise electronic coupons for use in stores contained in a shopping mall, and would further indicate that the user should hold their WCD near to a target area in order to receive coupons. The target area includes a target object containing machine-readable data. The user holds their WCD up to the display in order to receive coupons in step 602. Per steps 604 and 606, a transaction transparent to the user occurs wherein the WCD scans the target object and machine-readable data, including tag information, is transmitted from the target object to the memory of the WCD.

Figure 7:
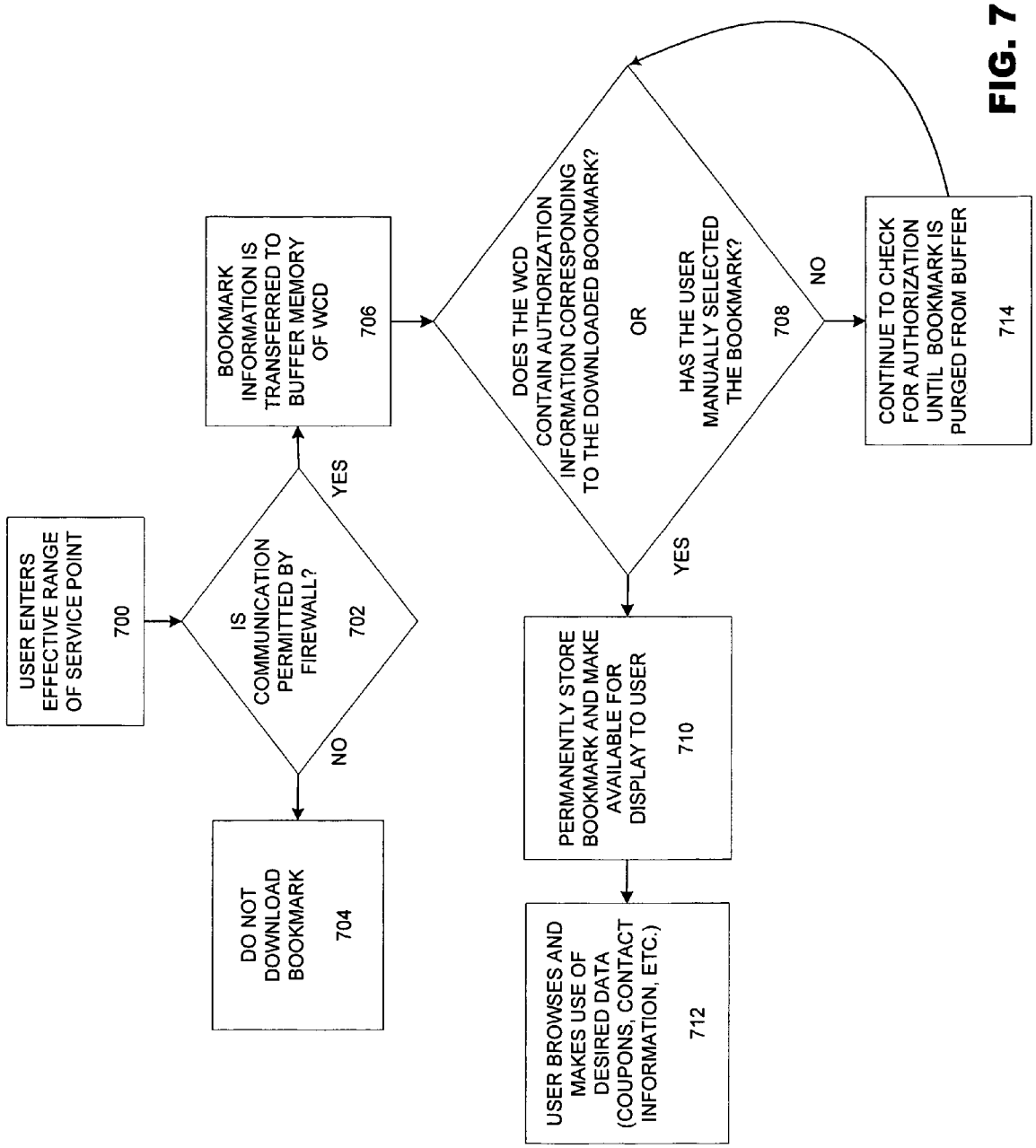
FIG. 7 is a representation of the process when a bookmark is received by a wireless communication device in accordance with an embodiment of the present invention.

In FIG. 7, the user enters the shopping mall and begins to traverse from store to store. Various stores within the shopping mall may contain service points using short-range communications to transmit data within a limited effective range. When a user enters the area covered by the service point, step 700, the service point initiates contact with the WCD. Firewall 226 may then check the identification of the service point in step 702 to verify whether the service point identification number corresponds to a trusted service provider and/or whether the user has indicated that the content of the service point should be excluded. If the service point is excluded, the bookmark is not downloaded and the connection to the service point is severed in step 704. Alternatively, the communication is permitted and the bookmark is downloaded to a temporary buffer in step 706. The WCD then determines whether to permanently store the bookmark in step 708. A bookmark is permanently stored either when a stored tag corresponds to the bookmark, or when the user browses the memory of the WCD and manually selects the bookmark. If one of these conditions are true, the bookmark is permanently stored in step 710. The WCD then makes this permanently stored information available to the user in step 712. If the answers to the questions posed in 708 are negative, in step 714 the bookmark will remain in the temporary buffer until one of the conditions of step 708 are true, or until the bookmark is purged from the temporary buffer, for instance on a FIFO (First In First Out) basis.

An exemplary user interface is shown in FIG. 8. The user interface 800 includes icons 802 related to downloaded data that has been made available for user interaction. These icons may be activated to open additional user interface displays that were downloaded from the service point. The interface may allow the user to request additional content to be downloaded from a cellular network, or to send messages via a messaging service like SMS. A second embodiment of the exemplary user interface is shown at 804. This alternative user interface includes an "Excluded" folder 806 for storing service bookmarks or service provider IDs which are barred from communicating with the WCD. Information included in this folder may prevent the WCD from accepting spam or malicious programs such as viruses at lowest interface level.

A benefit of the invention is that it does not matter whether the bookmark or the tag is downloaded first. It will always appear to the user that the desired content appeared as a result of the machine-readable tag data being scanned. This occurs because even if the bookmark was downloaded first, the content related to the bookmark will remain hidden in a temporary state until a corresponding tag has been downloaded.

Accordingly, it will be apparent to persons skilled in the relevant art that various changes in form a and detail can be made therein without departing from the spirit and scope of the invention. This the breadth and scope of the present invention should not be limited by any of the above-described exemplary embodiments, but should be defined only in accordance with the following claims and their equivalents.

What is claimed is:

1. A method comprising:
    receiving service information via a wireless connection;
    receiving service authentication information via a wireless communication medium distinct from the wireless connection by way of machine through reading a service authentication and authorization tag;
    comparing the service information to the service authentication information;
    authenticating a service if the service information corresponds to the service authentication information;
    receiving user authorization information via the wireless communication medium;
    comparing the service information to the user authorization information;
    authorizing the service information if the service information corresponds to the user authorization information; and
    if the service is authenticated and the service information is authorized, moving the received service information to a storage of a wireless communication device and the service information is accessible on the wireless communication device.

2. The method of claim 1, wherein the wireless connection is a short through range communication network.

3. The method of claim 2, wherein the wireless connection is at least one of a Bluetooth™ network, a Wireless Local Area Network (WLAN), an Ultra Wide Band Network (UWB), or a Wireless Universal Serial Bus Network (WUSB).

4. The method of claim 1, wherein the machine through reading is performed via at least one of a Radio Frequency Identification (RFID) communication, a Bar Code Reader (BCR) communication including processes related to interpreting UPC labels, an Optical Character Recognition (OCR) communication, a Magnetic Ink Character Recognition (MICR) communication, a Conductive Ink Recognition communication or an Ultra Violet (UV) Ink Recognition communication.

5. The method of claim 1, wherein the service information includes bookmark information related to a particular service, further comprising:
if the service is authenticated and the service information is not authorized, continuing checking for authorization until the bookmark information is purged from a buffer on a first in first out (FIFO) basis.

6. The method of claim 5, wherein the service is accessible via wide through area network connection.

7. The method of claim 1, wherein the storage includes at least a service information database.

8. The method of claim 5, wherein the bookmark information includes at least one of universal resource locator (URL) information, telephone number information, email address information or Short Messaging Service (SMS) keyword information.

9. The method of claim 1, wherein the service is made available in a user interface upon authentication and authorization.

10. The method of claim 1, further including a firewall which may allow or exclude service information based on an identification related to an information provider.

11. An apparatus comprising:
one or more receivers configured to receive service information via a wireless connection, to receive service authentication information via a wireless communication medium distinct from the wireless connection by way of machine reading a service authentication and authorization tag, and to receive user authorization information via the wireless communication medium; and
a processor configured to compare the service information to the service authentication information and to authenticate a service if the service information corresponds to the service authentication information as well as configured to compare the service information to the user authorization information and to authorize the service information if the service information corresponds to the user authorization information, and if the service is authenticated and the service information is authorized, configured to move the service information to a storage of a wireless communication device and the service information is accessible on the wireless communication device.

12. The apparatus of claim 11, wherein the wireless connection is a short through range communication network.

13. The apparatus of claim 12, wherein the wireless connection is at least one of a Bluetooth™ network, a Wireless Local Area Network (WLAN), an Ultra Wide Band Network (UWB), or a Wireless Universal Serial Bus Network (WUSB).

14. The apparatus of claim 11, wherein the machine through reading is performed via at least one of a Radio Frequency Identification (RFID) communication, a Bar Code Reader (BCR) communication including processes related to interpreting UPC labels, an Optical Character Recognition (OCR) communication, a Magnetic Ink Character Recognition (MICR) communication, a Conductive Ink Recognition communication or an Ultra Violet (UV) Ink Recognition communication.

15. The apparatus of claim 11, wherein the service information includes bookmark information related to a particular service, and
the processor is further configured to, if the service is authenticated and the service information is not authorized, continue checking for authorization until the bookmark information is purged from a buffer on a first in first out (FIFO) basis.

16. The apparatus of claim 15, wherein the service is accessible via wide through area network connection.

17. The apparatus of claim 15, wherein the bookmark information includes at least one of universal resource locator (URL) information, telephone number information, email address information or Short Messaging Service (SMS) keyword information.

18. The apparatus of claim 11, wherein the service is made available in a user interface upon authentication and authorization.

19. The apparatus of claim 11, further including a firewall which may allow or exclude service information based on an identification related to an information provider.

20. A computer program product comprising a computer readable storage medium having computer readable program code embodied in said medium, said program product comprising:
a computer readable program code configured to receive service information via a wireless connection;
a computer readable program code configured to receive service authentication information via a wireless communication medium distinct from the wireless connection by way of machine through reading a service authentication and authorization tag;
a computer readable program code configured to compare the service information to the service authentication information;
a computer readable program code configured to authenticate a service if the service information corresponds to the service authentication information;
a computer readable program code configured to receive user authorization information via the wireless communication medium;
a computer readable program code configured to compare the service information to the user authorization information;
a computer readable program code configured to authorize the service information if the service information corresponds to the user authorization information; and
a computer readable program code configured to, if the service is authenticated and the service information is authorized, move the service information to a storage of a wireless communication device and the service information is accessible on the wireless communication device.

21. The computer program product of claim 20, wherein the wireless connection is a short through range communication network.

22. The computer program product of claim 21, wherein the wireless connection is at least one of a Bluetooth™ network, a Wireless Local Area Network (WLAN), an Ultra Wide Band Network (UWB), or a Wireless Universal Serial Bus Network (WUSB).

23. The computer program product of claim 20, wherein the machine through reading is performed via at least one of a Radio Frequency Identification (RFID) communication, a Bar Code Reader (BCR) communication including processes related to interpreting UPC labels, an Optical Character Recognition (OCR) communication, a Magnetic Ink Character Recognition (MICR) communication, a Conductive Ink Recognition communication or an Ultra Violet (UV) Ink Recognition communication.

24. The computer program product of claim 20, wherein the service information includes bookmark information related to a particular service, farther comprising:
    a computer readable program code configured to, if the service is authenticated and the service information is not authorized, continue checking for authorization until the bookmark information is purged from a buffer on a first in first out (FIFO) basis.

25. The computer program product of claim 24, wherein the service is accessible via wide through area network connection.

26. The computer program product of claim 20, wherein the storage includes at least a service information database.

27. The computer program product of claim 24, wherein the bookmark information includes at least one of universal resource locator (URL) information, telephone number information, email address information or Short Messaging Service (SMS) keyword information.

28. The computer program product of claim 20, wherein the service is made available in a user interface upon authentication and authorization.

29. The computer program product of claim 20, further including a firewall which may allow or exclude service information based on an identification related to an information provider.

30. A method comprising:
    receiving service information via a Bluetooth™ connection, the service information being received and placed in temporary storage based at least in part on user settings;
    receiving service authentication information via RFID communication;
    comparing the received service information to the service authentication information;
    authenticating a service if the service information corresponds to the service authentication information;
    receiving user authorization information via the RFID communication;
    comparing the service information to the user authorization information;
    authorizing the service information if the service information corresponds to the user authorization information; and
    if the service is authenticated and the service information is authorized, moving the service information to regular storage.

31. An apparatus comprising:
    one or more receivers configured to receive service information via a Bluetooth™ connection, the service information being received and placed in temporary storage based at least in part on user settings, to receive service authentication information via RFID communication, and to receive user authorization information via the RFID communication;
    a processor configured to compare the received service information to the service authentication information and to authenticate a service if the service information corresponds to the service authentication information as well as configured to compare the service information to the user authorization information and to authorize the service information if the service information corresponds to the user authorization information; and
    if the service is authenticated and the service information is authorized, a processor for moving the service information to regular storage.

32. A computer program product comprising a computer readable storage medium having computer readable program code embodied in said medium, said product comprising:
    a computer readable program code configured to receive service information via a Bluetooth™ connection, the service information being received and placed in temporary storage based at least in part on user settings;
    a computer readable program configured to receive service authentication information via REID communication;
    a computer readable program code configured to compare comparing the service information to the service authentication information;
    a computer readable program code configured to authenticate a service if the service information corresponds to the service authentication information;
    a computer readable program code configured to receive user authorization information via the REID communication;
    a computer readable program code configured to compare the service information to the user authorization information;
    a computer readable program code configured to authorize the service information if the service information corresponds to the user authorization information; and
    a computer readable program code for, if the service is authenticated and the service information is authorized, moving the service information to regular storage.

33. An apparatus comprising:
    means for receiving service information via a wireless connection;
    means for receiving service authentication information via a wireless communication medium distinct from the wireless connection by way of machine through reading a service authentication and authorization tag;
    means for comparing the service information to the service authentication information;
    means for authenticating a service if the service information corresponds to the service authentication information;
    means for receiving user authorization information via the wireless communication medium;
    means for comparing the service information to the user authorization information;
    means for authorizing the service information if the service information corresponds to the user authorization information; and
    means for, if the service is authenticated and the service information is authorized, moving the received service information to a storage of a wireless communication device and the service information is accessible on the wireless communication device.

\* \* \* \* \*